United States Patent [19]
Anthon et al.

[11] Patent Number: 6,088,153
[45] Date of Patent: Jul. 11, 2000

[54] MULTI-FUNCTIONAL OPTICAL ISOLATOR

[75] Inventors: Douglas W. Anthon, Wheaton; Donald L. Sipes, Jr., Crystal Lake, both of Ill.

[73] Assignee: Scientific-Atlanta, Inc., Norcross, Ga.

[21] Appl. No.: 09/090,505

[22] Filed: Jun. 4, 1998

Related U.S. Application Data

[63] Continuation-in-part of application No. 08/883,489, Jun. 26, 1997, abandoned.

[51] Int. Cl.⁷ ........................................................ H01S 3/00
[52] U.S. Cl. ............................................. 359/341; 385/34
[58] Field of Search ................................ 385/34; 359/341

[56] References Cited

U.S. PATENT DOCUMENTS

| | | |
|---|---|---|
| Re. 35,575 | 7/1997 | Pan . |
| 4,178,073 | 12/1979 | Uchida et al. . |
| 4,548,478 | 10/1985 | Shirasaki . |
| 4,756,607 | 7/1988 | Watanabe et al. . |
| 4,893,890 | 1/1990 | Lutes et al. . |
| 5,050,183 | 9/1991 | Duling, III . |
| 5,105,307 | 4/1992 | Nishiyama et al. . |
| 5,134,621 | 7/1992 | Marshall . |
| 5,210,808 | 5/1993 | Grasso et al. . |
| 5,237,445 | 8/1993 | Kazuta . |
| 5,262,892 | 11/1993 | Nakamura . |
| 5,267,077 | 11/1993 | Blonder . |
| 5,278,853 | 1/1994 | Shirai et al. . |
| 5,283,846 | 2/1994 | Toyonaka et al. . |
| 5,315,431 | 5/1994 | Masuda et al. . |
| 5,345,329 | 9/1994 | Shirai et al. . |
| 5,375,009 | 12/1994 | Otani et al. . |
| 5,375,010 | 12/1994 | Zervas et al. . |
| 5,381,261 | 1/1995 | Hirai et al. . |
| 5,408,354 | 4/1995 | Hosokawa . |
| 5,408,491 | 4/1995 | Hirai et al. . |
| 5,428,477 | 6/1995 | Siroki . |
| 5,446,578 | 8/1995 | Chang et al. . |
| 5,446,813 | 8/1995 | Lee et al. . |
| 5,493,440 | 2/1996 | Souda et al. ............................ 359/341 |
| 5,499,307 | 3/1996 | Iwatsuka . |
| 5,539,574 | 7/1996 | Robinson . |
| 5,566,259 | 10/1996 | Pan et al. . |
| 5,574,595 | 11/1996 | Kurata et al. . |
| 5,659,644 | 8/1997 | DiGiovanni et al. . |
| 5,689,359 | 11/1997 | Kurata et al. . |
| 5,706,371 | 1/1998 | Pan . |
| 5,850,493 | 12/1998 | Cheng ......................................... 385/34 |
| 5,880,875 | 3/1999 | Kim ........................................ 359/341 |

*Primary Examiner*—Mark Hellner
*Attorney, Agent, or Firm*—Kelly A. Gardner; Kenneth M. Massaroni; Hubert J. Barnhardt, III

[57] ABSTRACT

A multi-functional optical isolator that couples radiation from a plurality of input fibers to a plurality of output fibers such that an optical beam emitted from any particular input fiber is transmitted only to its corresponding output fiber. Additionally, an optical beam emitted in the reverse direction from any output fiber is not transmitted back into any of the input or output fibers. The multi-functional optical isolator includes a first focusing lens that collimates the optical radiation emitted from the input fibers and causes them to pass through an optical isolator. The optical isolator has polarizing elements and a magneto-optic polarization rotator. A second focusing lens focuses the optical beams into the output fibers such that the optical radiation from each input fiber is coupled to its corresponding output fiber. Additional off-axis optical elements at other wavelengths may be used for providing bulk-optic coupling of a pump light into a single-mode or multi-mode core of a doped fiber. A vee-shaped isolator with a high reflector in the isolated beam path is possible and provides for additional beams coupled through the reflector.

12 Claims, 12 Drawing Sheets

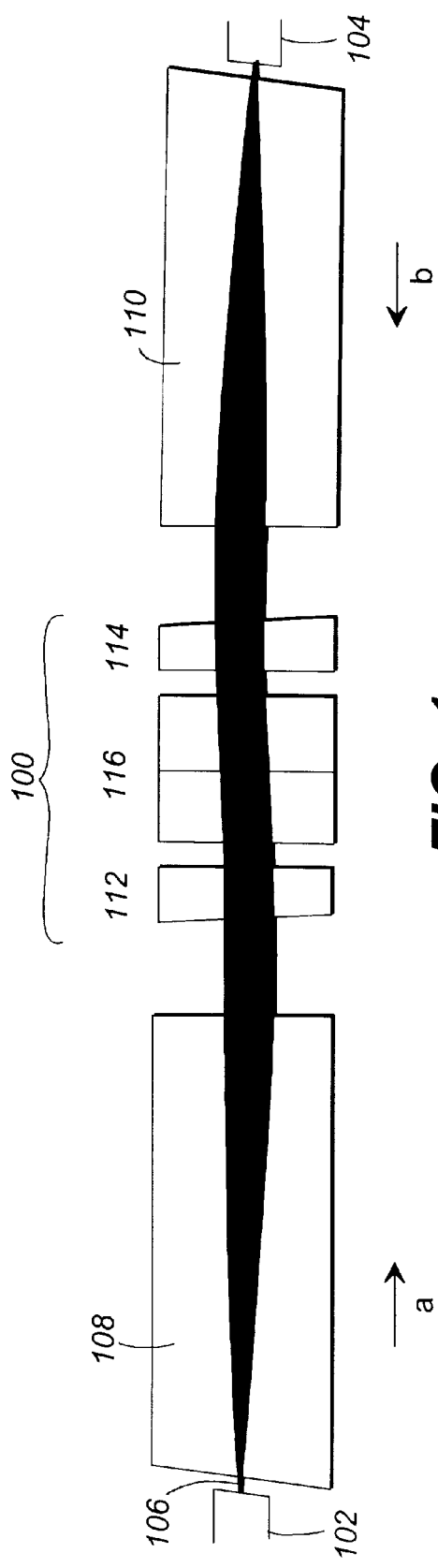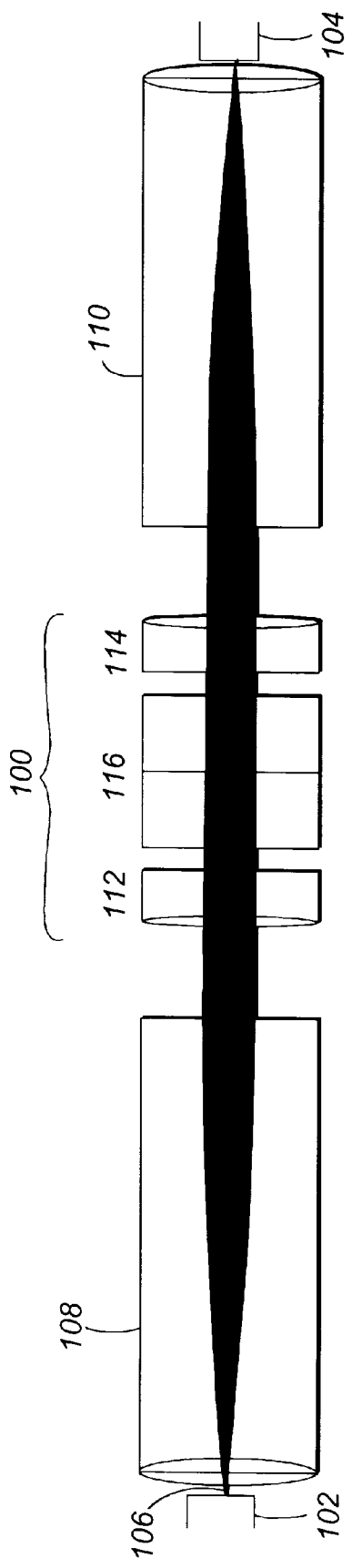

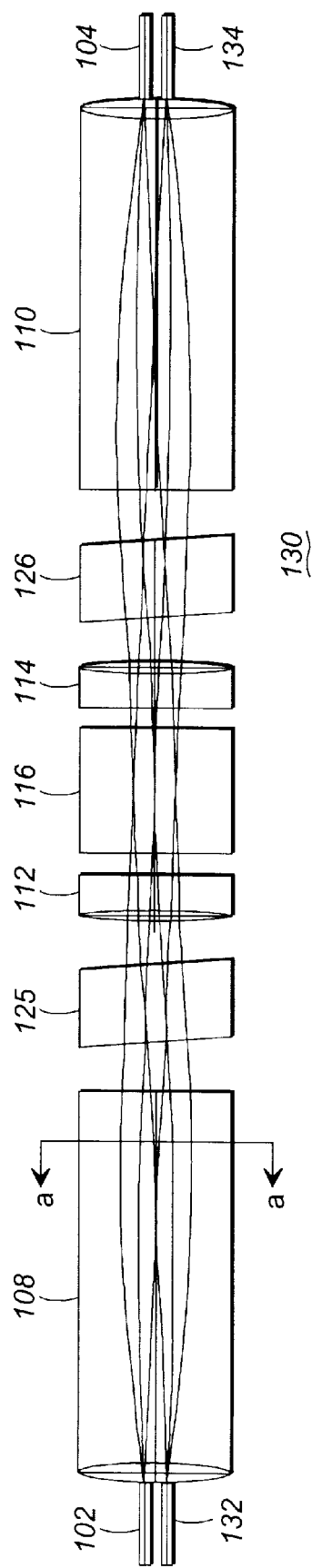
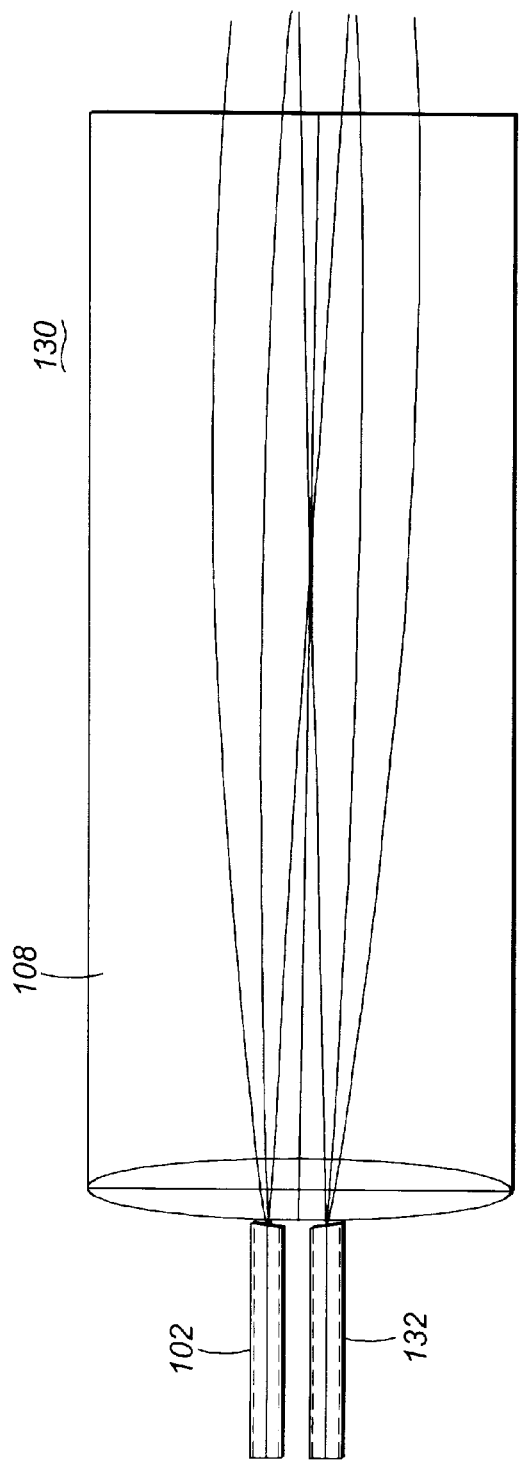
FIG. 14
FIG. 15

MULTI-FUNCTIONAL OPTICAL ISOLATOR

CROSS-REFERENCE TO RELATED APPLICATIONS

This application is a continuation-in-part of commonly assigned, U.S. application Ser. No. 08/883,489, Anthon et al., filed Jun. 26, 1997 entitled "Multi-Functional Optical Isolator" now abandoned (Attorney Docket No. A-2857).

BACKGROUND OF THE INVENTION

1. Field of the Invention

The present invention generally relates to optical fiber technology and, more particularly, to a multi-functional optical isolator that couples optical radiation in one direction from a plurality of input fibers to a corresponding plurality of output fibers and which does not allow coupling in the reverse direction.

2. Description of the Related Art

Generally, an optical isolator transmits optical radiation from an input port to an output port while blocking transmission in the opposite direction. Conventional optical isolators combine polarizing elements with a nonreciprocal 45 degree magneto-optic polarization rotator to accomplish this. In one embodiment, a polarization-sensitive isolator corresponds to a pair of polarizers configured to appear open in the forward direction and crossed in the reverse direction. One forward polarization is transmitted, while the reverse beam is blocked by absorption or reflection in the polarizer. In another embodiment, a polarization-insensitive isolator corresponds to a pair of birefringent beam displacing prisms, configured so the polarization-dependent displacements cancel in the forward direction, and add in the reverse direction. Both polarization components of the forward beam are recombined at the output aperture to allow transmission, while the two polarization components of the reverse beam remain spatially displaced and do not pass through the input aperture. In both embodiments, lenses can be used to couple the input and output beams to the appropriate fibers.

Normally, the optical isolation system is used to isolate a single input and output fiber. Using the conventional optical isolation system, at least two isolators will be required, if there is optical radiation emerging from more than one input fiber. The cost and complexity of the conventional optical isolation system are barriers for use in systems with more than one input and output fiber. Systems, such as optical amplifiers, often use several polarization insensitive isolators, that are among the most expensive components in the system. Dichroic fiber couplers used to couple the pump light into the active fiber are also costly, particularly in systems where fused couplers and fusion splices cannot be used, such as when double clad or non-silicate glass gain fibers are used.

Consequently, there remains a need in the art for an optical isolator that couples optical radiation from a plurality of input fibers to a plurality of output fibers while not coupling optical radiation from the output fibers to the input fibers in a cost effective, efficient manner. Additionally, the capability to add other optical elements to the isolation system is also needed.

BRIEF DESCRIPTION OF THE DRAWINGS

In the following detailed description of the preferred and alternative embodiments, reference will be made to the accompanying drawings wherein:

FIG. 1 shows a diagram of an optical isolator for one input and output fiber, using a fiber wedged by approximately 6 degrees in the plane of the figure (fiber diameter exaggerated for clarity);

FIG. 2 shows the system in FIG. 1 rotated by 90 degrees;

FIGS. 12 and 14 are top and side views, respectively, of a multichannel embodiment of the optical isolator of FIG. 6 having multiple input and output fibers in accordance with the present invention;

FIGS. 13 and 15 are respective expanded, cutaway top and side views of the multichannel optical isolator of FIGS. 12 and 14, respectively, in accordance with the present invention.

DETAILED DESCRIPTION OF THE PREFERRED EMBODIMENTS

Figure 3:
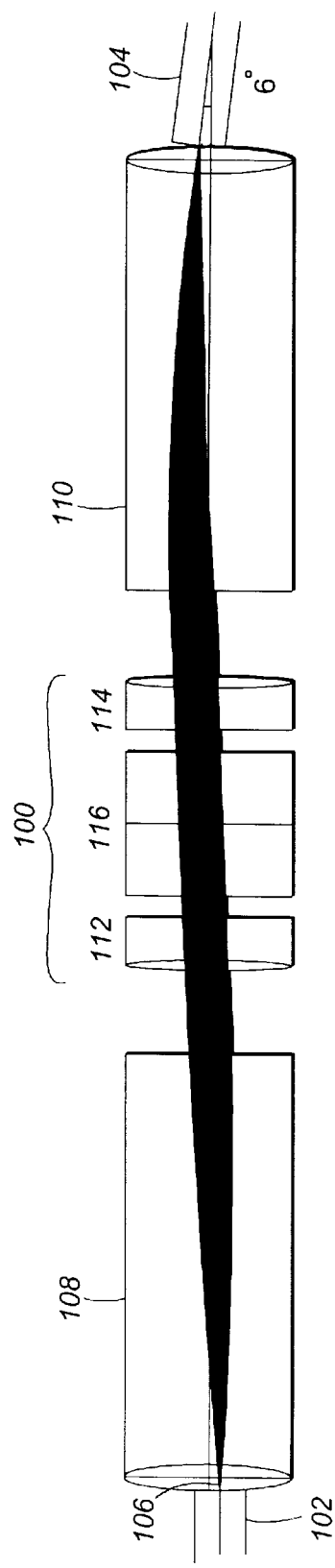
FIG. 3 shows the system in FIG. 2 with the input fiber offset in the plane of the figure by 125 μm.

Referring to FIG. 1 and FIG. 2, a conventional approach used for isolating single input and output fibers is shown. FIG. 2 shows the system of FIG. 1 rotated by 90 degrees. The ellipses in FIG. 2 correspond to the projections of the wedged ends of the cylindrical elements. The optical isolator 100 of FIG. 1 is collinear with a first optical fiber 102 and a second optical fiber 104. Optical radiation 106 is transmitted in the direction a from the first optical fiber 102 to the second optical fiber 104. The optical isolator 100 passes light in a forward direction (i.e. direction a in FIG. 1) and prevents reflected light traveling in a reverse direction (i.e. direction b in FIG. 1) from coupling back into the input fiber 102. Reflected light into a fiber source can, for example, cause the laser used as the light source to become unstable. The optical isolator 100 eliminates these problems by preventing the reflected light from entering the input fiber 102.

Generally, the optical isolator 100 includes a pair of polarization elements 112 and 114, and a magneto-optic element 116. A pair of focusing lenses 108 and 110 are located adjacent to the first optical fiber 102 and second optical fiber 104 respectively. Isolators exist as both polarization-insensitive and polarization-sensitive types. The two devices have much in common and the same figure can be used to describe both types.

First consider the polarization-insensitive case. The fiber 102 is wedged in this example by approximately 6 degrees as shown in FIG. 1, so that the output beam emerging from the fiber is refracted approximately 2.66 degrees up from the device axis. The next element in the beam path is the collimating lens 108. The lenses 108 and 110 are shown as standard 8 degree wedged, 0.23 pitch, 0.46 numerical aperture (NA) Gradient Index (or GRIN) lens, available from NSG. Other lenses may be utilized that accomplish a similar result. This beam entering the GRIN lens is refracted in this example 1.33 degrees down from the device axis, and then propagates as shown through the lens. The resulting beam is nearly collimated when it exits the lens. Note that it does not exit at normal incidence. This minimizes back reflections. Provided that back reflections are avoided, other lenses, such as molded aspheric lenses may also be used.

The next element is the birefringent prism 112. The two identical prisms 112 and 114 are made from a birefringent material or equivalent, such as rutile and oriented, for example, so that their optical axes are oriented at for example, −22.5 degrees and +22.5 degrees away from being perpendicular to the plane of the figure. These prisms are wedged by approximately 3.5 degrees, so they will split the incident beam into a pair of angularly resolved, linearly polarized rays whose planes of polarization are oriented in mutually perpendicular directions. Because the beam propagation direction is nearly perpendicular to the optic axis, walkoff is negligible.

In the forward direction, the magneto-optic rotator 116 is set, for example, to produce a 45 degree polarization rotation. The rotator 116 comprises, for example, a bismuth iron garnet (BIG) film on a GGG substrate in the field of a permanent magnet. The rotator 116 is substantially parallel to the birefringent prisms 112 and 114. The angle and thickness of the prisms 112 and 114 and the rotator 116 combine so that the transverse offset exactly offsets the beam displacement.

The prism 112 splits the incident beam into an ordinary and an extraordinary ray. The 45 degree polarization rotation in rotator 116 is oriented so that the ordinary and extraordinary rays in prism 112 are transferred to the ordinary and extraordinary rays in prism 114. Since the both rays see identical refractive indices in both prisms, the combination of the prisms 112 and 114 and the rotator 116 acts like a parallel plate. The two output rays are parallel, resulting in a single output beam that is focused by the lens 110 into the fiber 104.

A beam traveling in the reverse direction from fiber 104 towards fiber 102 will be similarly divided into two orthogonally polarized beams by prism 114, but because of the nonreciprocal polarization rotation in rotator 116, the ordinary and extraordinary rays in prism 114 will become the extraordinary and ordinary rays in prism 112. Because the refractive indices are different in the two prisms, the combinations of the prisms 112 and 114 and the rotator 116 act like wedges for the two rays. The two output rays are not parallel, and neither of the resulting output beams is focused by the lens 108 into the fiber 102, coming instead to foci that are displaced tens of μm above and below the core of fiber 102 in the plane of FIG. 1.

In the case of a polarization-sensitive isolator, elements 112 and 114 would be polarizers that transmit only the linear polarization oriented at, for example, −22.5 degrees and +22.5 degrees, respectively, away from being perpendicular to the plane of the figure. One polarization component of the beam would be passed by prism 112, and after the 45 degree rotation in rotator 116, would also be passed by prism 114, and then focused by the lens 110 into the fiber 104. For a beam traveling in the reverse direction from fiber 104 towards fiber 102, one polarization component of the beam would be passed by prism 114, but because of the nonreciprocal −45 degree polarization rotation in rotator 116, it would be blocked by prism 112. The beam would not reach the fiber, so there would seem to be no displaced beams to consider. However, the angles and wedges of the components shown have all been chosen to avoid any normal incidence reflections to avoid coupling any surface reflections back into the input fiber. With the wedges shown, these reflections will all be displaced from the input fiber in the plane of FIG. 1.

Varying the location of the input fiber can be used to demonstrate that the system has the capability to support a plurality of input and corresponding output fibers. The displacements used to multiplex multiple fibers should be in the plane of FIG. 2. A displacement in the other plane would be similar in most respects, but it would be less desirable. This is because the offsets in this plane are already being used to separate the reverse beams, and the internal back reflections from the input aperture in the isolator. Displacements in this plane would increase the probability of back reflections and crosstalk.

FIG. 3 describes a first embodiment of the present invention in which a predetermined offset or displacement is introduced in the relationship between the optical fiber 102 and the fiber 104. FIG. 3 shows the system of FIG. 2 with the input fiber 102 displaced by 125 μm. It can be seen that for this predetermined displacement there is a corresponding offset of −125 μm at the output fiber 104. Although the input and output beams are at the same distance from the center of the lens, the system is not symmetrical. The input beams are parallel to the lens 108 axis, while the outputs, for example, exit the lens 110 at, for example, a 6 degree angle. Coupling fibers to this system would be difficult because the fibers are oriented differently in the two axes.

Figure 4:
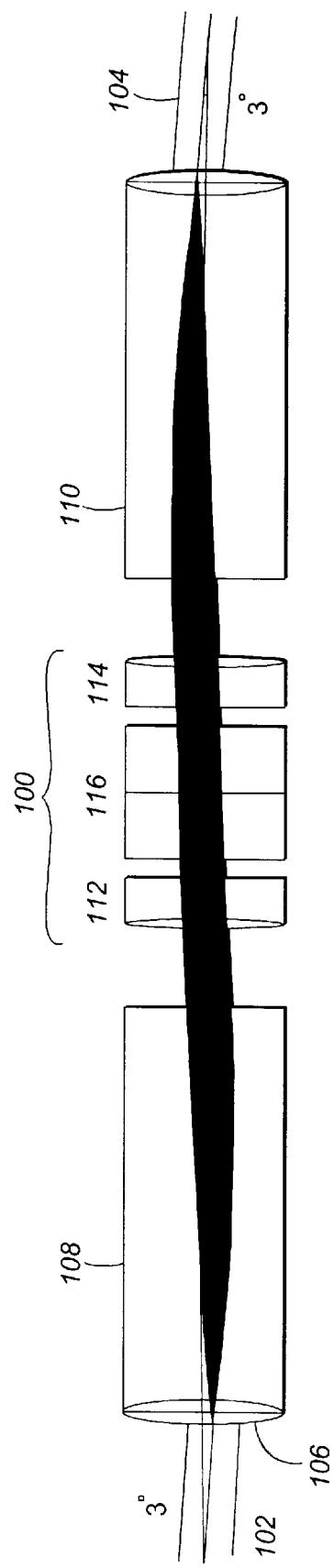
FIG. 4 shows the system in FIG. 2 with the input fiber rotated in the plane of the figure by approximately 3 degrees and offset in the plane of the figure by 125 μm.
Figure 4A:
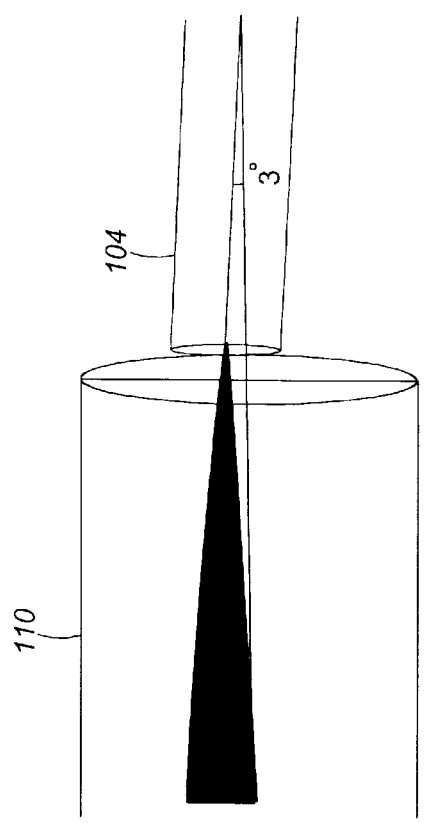
FIG. 4A shows a detailed view of the output fiber of the system in FIG. 4.
Figure 5:
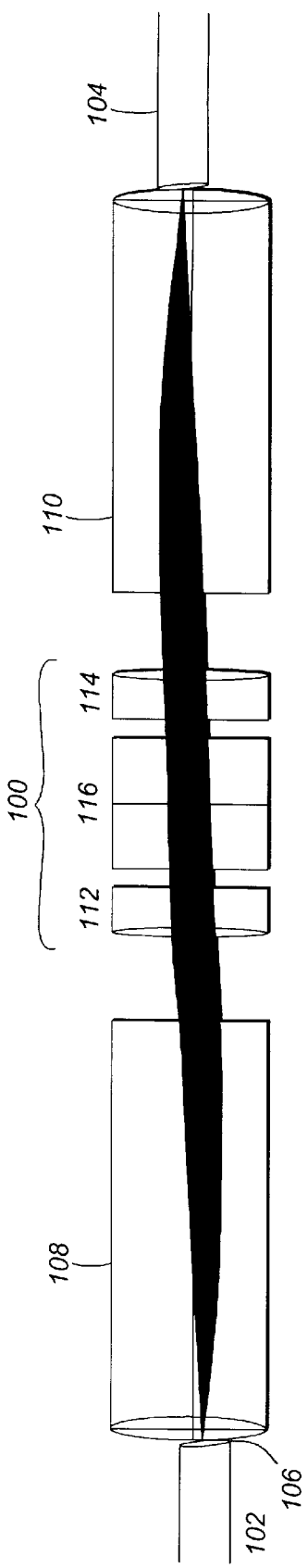
FIG. 5 shows the system in FIG. 2 with the wedge on the input fiber equal to approximately 9 degrees, with the fiber rotated by approximately 48.42 degrees about its axis, and with the input fiber offset in the plane of the figure by 125 μm.
Figure 5A:
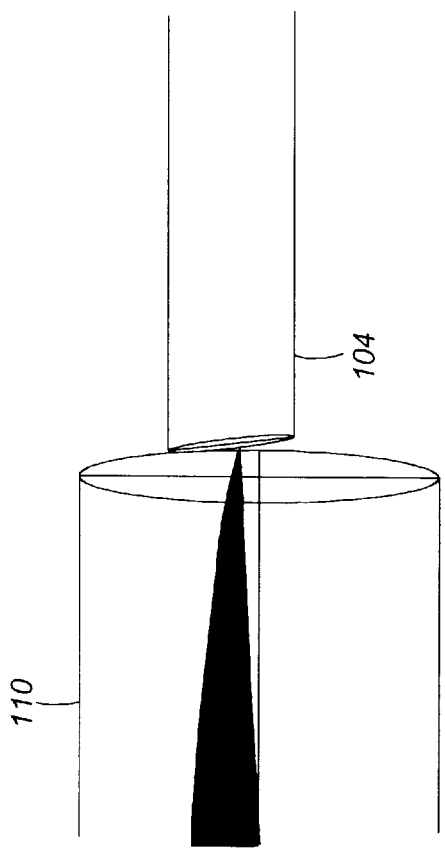
FIG. 5A shows a detailed view of the output fiber of the system in FIG. 5.

The system can be made symmetric by tilting the input 102 and output 104 fibers by approximately 3 degrees. FIG. 4 shows this modification to the embodiment of the invention of FIG. 3. The system in FIG. 4 is also somewhat inconvenient to implement because the input fibers are not parallel. Parallel fibers can be used if the fiber wedge is increased and the fiber is rotated so that the output beam is refracted in both planes. FIG. 4A shows a detailed view of the beam emitted from the lens 110 and into the output fiber 104 shown in FIG. 4. FIG. 5 shows how this rotation is achieved, with the wedge angle on the fiber, for example, being increased to approximately 9.00 degrees and the fiber being rotated by approximately 48.42 degrees about its axis. This gives an approximate 2.66 degree refraction in the plane of FIG. 1 and an approximate 3 degree refraction in the plane of FIG. 2, as required. In other embodiments, other wedge angles and rotation angles may be chosen to obtain a similar result. FIG. 5A shows a detailed view of the beam emitted from the lens 110 and into the output fiber 104 shown in FIG. 5.

Figure 6:
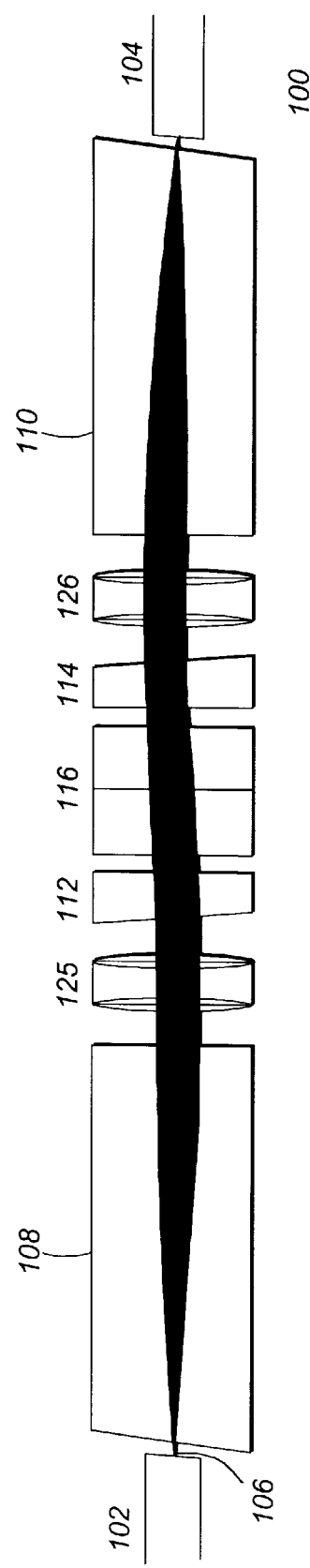
FIG. 6 shows the system in FIG. 1 with two additional elements placed between the lenses and the isolator.
Figure 7:
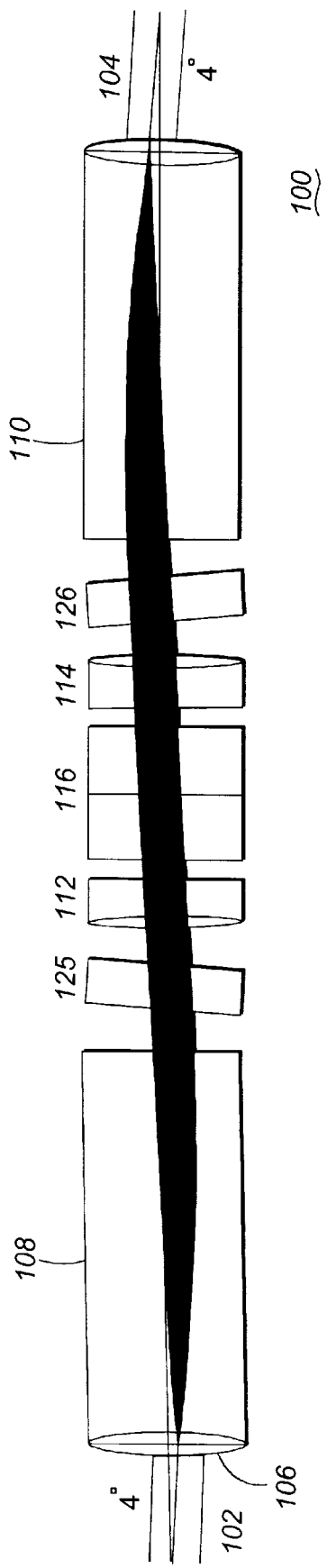
FIG. 7 shows the system in FIG. 6 rotated by 90 degrees with the input fiber rotated in the plane of the figure by approximately 4 degrees and offset in the plane of the figure by 125 μm.
Figure 8:
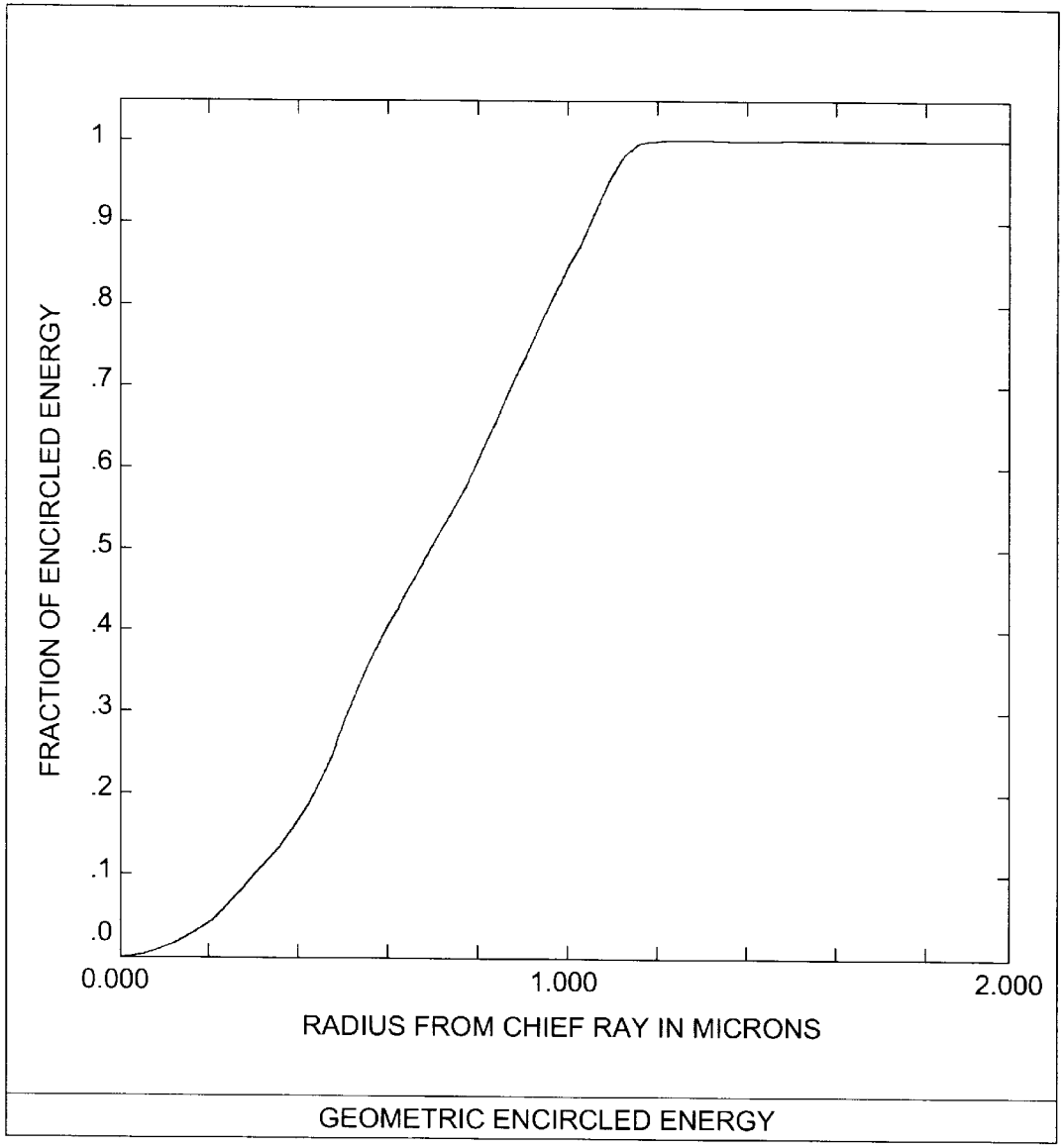
FIG. 8 shows the encircled energy plot for light at the output fiber of FIG. 2.

Further increase in the distance between the GRIN lenses can be compensated by increasing the tilt angle. FIGS. 6 (top view) and 7 (side view) show how two additional elements can be accommodated by increasing the input and output rotations to, for example, 4 degrees. These additional elements could be dichroic filters 125 and 126, or they could be used to reflect pump radiation into one of the fibers to provide pump light to a fiber amplifier. In the figures, the elements are tilted in the plane of FIG. 7. Arbitrary tilts in either axis are possible, provided that reflections off of these surfaces do not couple back into the input 102 or output 104 fibers.

Note that the addition of a dichroic reflector has virtually no effect on the operation of the isolator. The working wavelength range of an optical isolator is typically limited to less than 40 nm because of the wavelength dependence of the magneto-optic rotation. If the dichroic reflector is transmissive in this wavelength region, then its properties at other wavelengths have no effect on the properties of the isolator.

Figure 9:
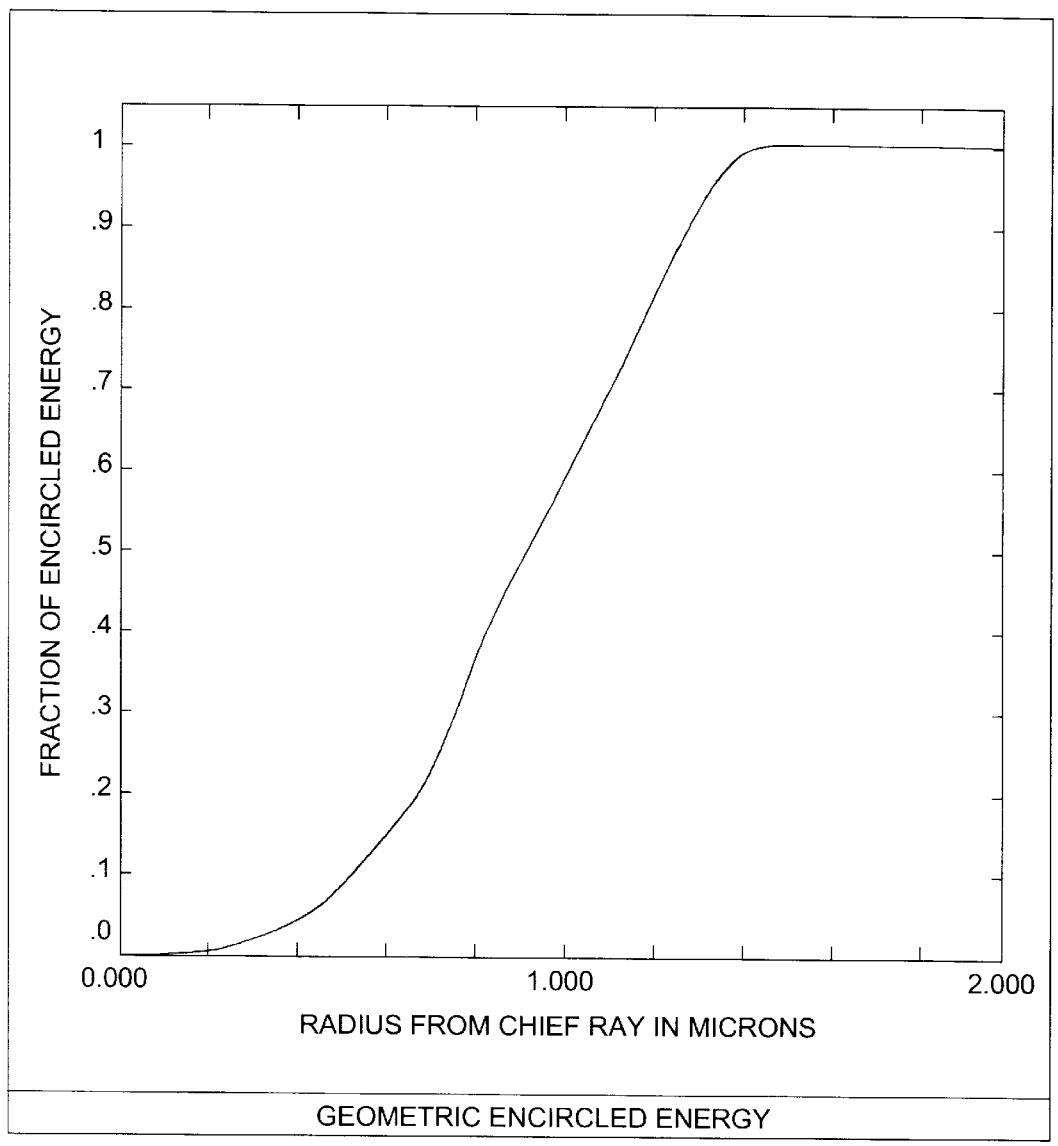
FIG. 9 shows the encircled energy plot for light at the output fiber of FIG. 4.
Figure 10:
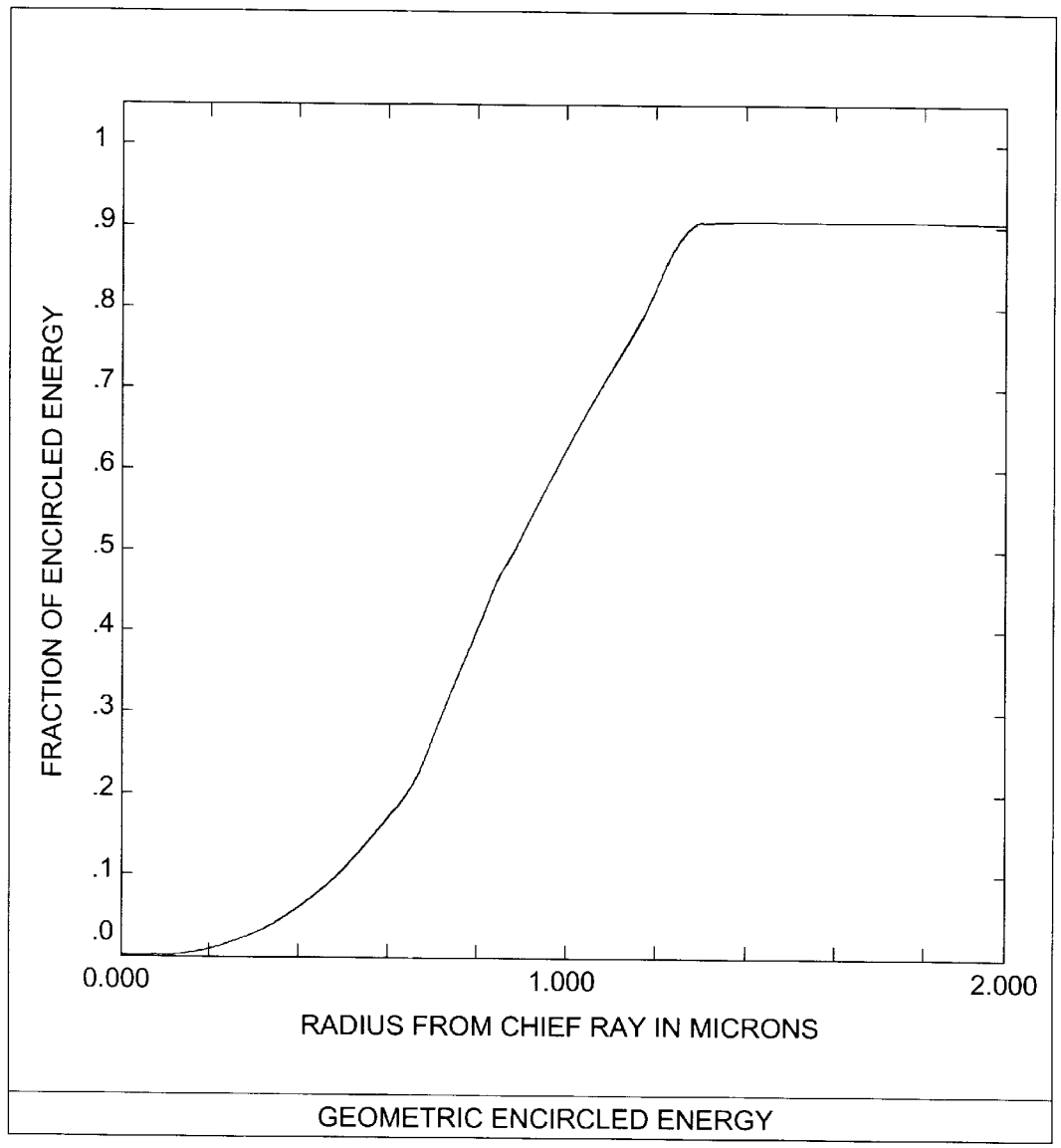
FIG. 10 shows the encircled energy plot for light at the output fiber of FIG. 5.
Figure 11:
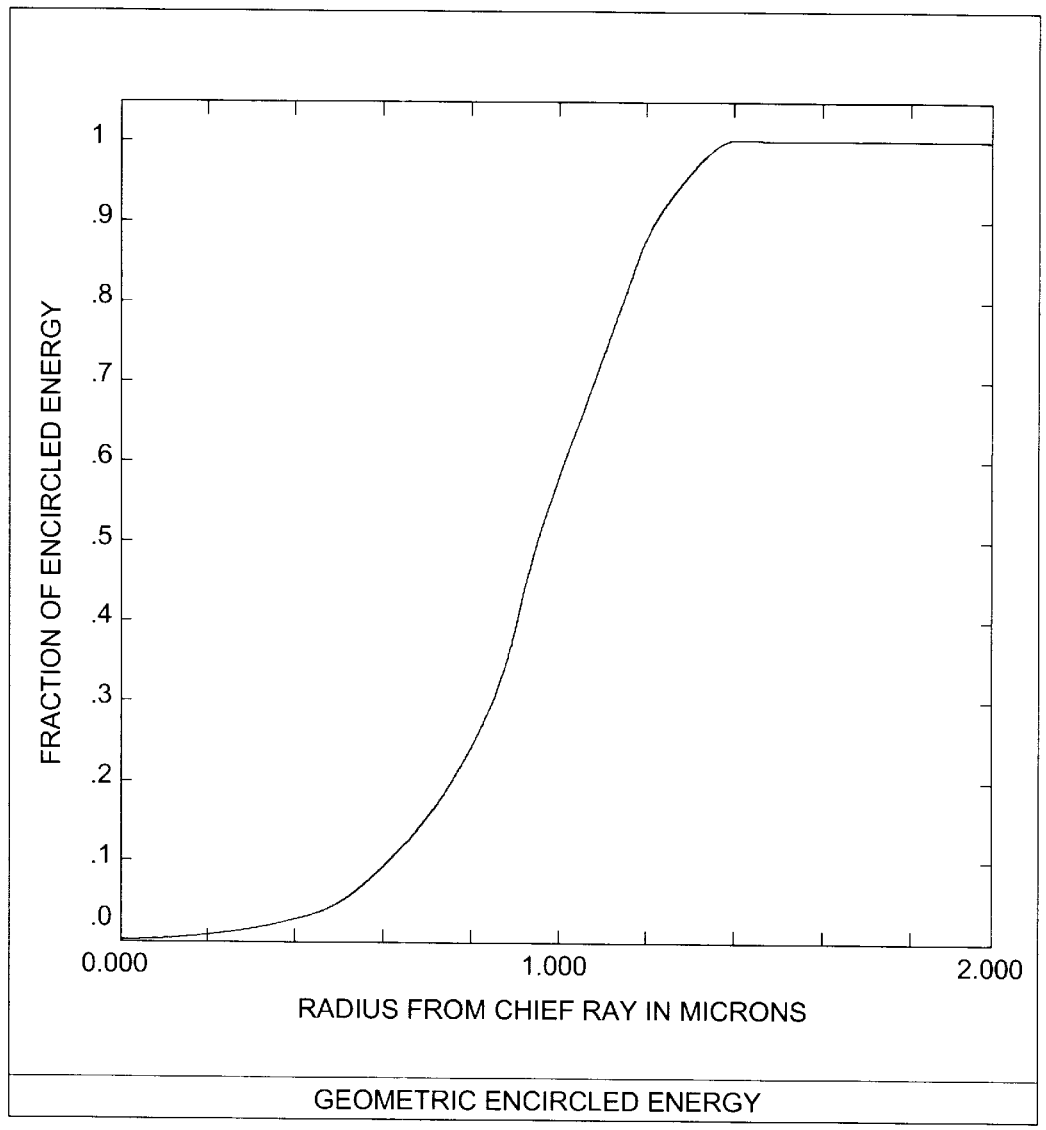
FIG. 11 shows the encircled energy plot for light at the output fiber of FIG. 6.

In shifting to an off axis geometry it is important to ensure that off-axis aberrations do not degrade the fiber image at the exit fiber. If the image spot size increases significantly, then fiber coupling efficiency will decrease. FIGS. 8–11 show the encircled energy for the various geometries in FIGS. 2, 4, 5, and 6 (where FIG. 8 corresponds to FIG. 2; FIG. 9 corresponds to FIG. 4; FIG. 10 corresponds to FIG. 5; and FIG. 11 corresponds to FIG. 6). Off-axis aberrations appear to be relatively insignificant for the offsets used here, although for larger offsets or longer devices they might eventually matter.

Figure 12:
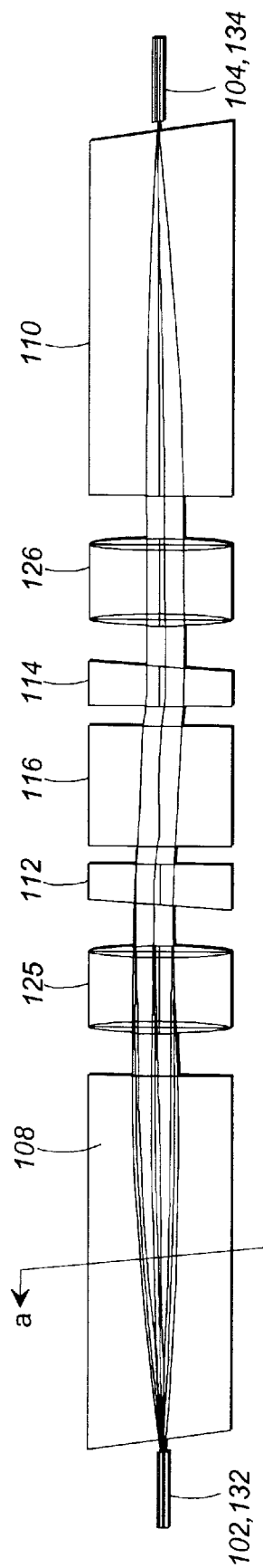

FIG. 12 shows a top view of the multi-functional optical isolation system 130 derived from the device in FIG. 6. The operation of this device is identical to that in FIG. 6 except that second input 132 and output 134 fiber have been added in the symmetrically opposite positions, in addition to the first input fiber 102 and the first output fiber 104. In accordance with the present invention, the multiple input fibers 102, 132 and the multiple output fibers 104, 134 are rotated and wedged. More specifically, the fibers 102, 132, 104, 134 are rotated about their respective optic axes in addition to having wedged end faces and are parallel to the GRIN lens 108. It can be seen from FIG. 12 and FIG. 14, which is a side view of the same multifiber optical isolator 130, that the backward rays that traverse the wedges in opposite polarizations are deflected away from the fiber core to provide isolation. The same modification can also be applied to the other optical isolation devices described in this specification, transforming them into multichannel isolators.

In a fiber coupled optical isolator it is often found to be convenient to incorporate additional optical elements such as filters or dichroic reflectors into the collimated section of the isolator. For isolators used in optical amplifiers, for example, these include optical filters for ASE suppression and dichroic reflectors for coupling of pump radiation into the fibers. These elements are highly transmissive in the relatively small wavelength range where the isolator is designed to operate and, provided that back reflections are avoided, do not affect the operation of the isolator. These components can all be thought of as part of the isolator optical system 130. Note that the same components can be included in the multichannel isolator to achieve the same functions as those described with reference to FIG. 6. Additional off-axis optical elements at other wavelengths may be used, provided that they do not interfere with the isolator beam path. These may be used, for example, for coupling pump radiation to a fiber amplifier. A vee-shaped isolator with a high reflector in the isolated beam path is also possible. Thus, beams could be coupled through the reflector.

Figure 13:
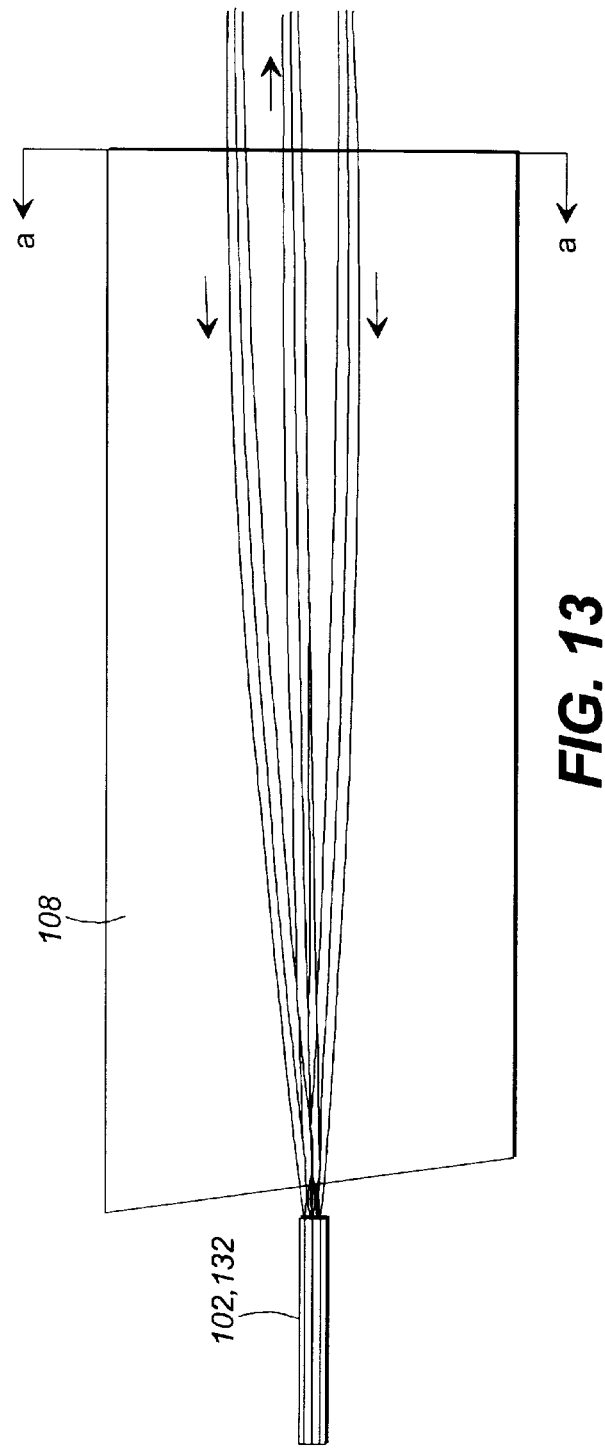

Referring next to FIGS. 13 and 15, expanded, cutaway top and side views, respectively, of the isolator 130 of FIGS. 12 and 14 are shown. In these figures, the two superimposed input fibers 102, 132 and the path of rays launched from the output that miss the core of the input fibers are shown. The dashed lines in the fibers 102, 132 show the orientation of the wedges on the rotated, wedged fibers 102, 132, and similar dashed lines (although less visible in FIGS. 13 and 15) show the orientation of the wedges on the output fibers 104, 134.

FIG. 14 is a side view of the multifiber optical isolator 130 including multiple input fibers 102, 132 and multiple output fibers 104, 134.

Figure 16:
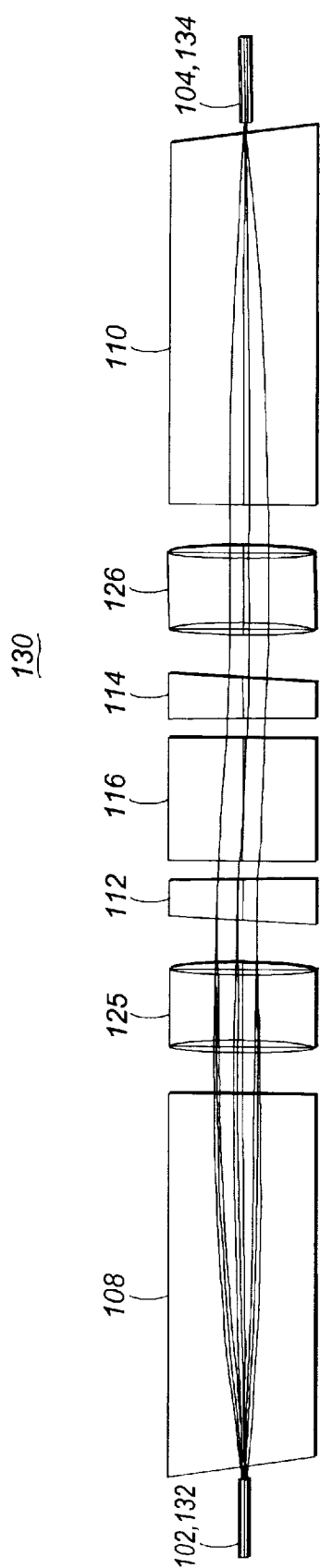
FIGS. 16 and 17 are respective top and side views of the multichannel optical isolator of FIGS. 12 and 14, respectively, in which a pump fiber supplies a pump beam in accordance with the present invention.
Figure 17:
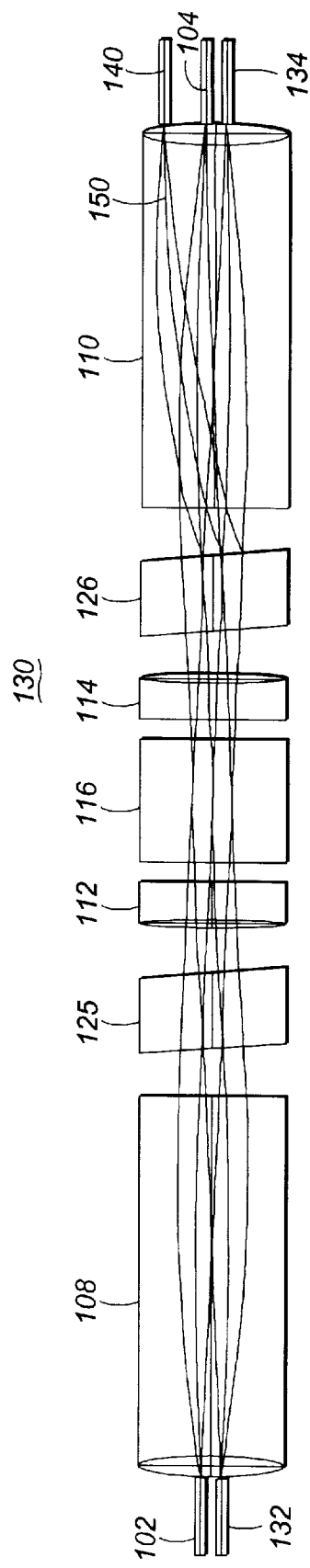

FIGS. 16 and 17 are top and side views, respectively, of the multichannel optical isolator 130 including a pump fiber 140. The dichroic reflector 125 is shown reflecting a pump beam 150 so that it couples the output of a fiber 140 to the input fibers 102, 132. This beam path can be used to couple pump radiation to a fiber amplifier connected to fibers 102, 132. Note that these embodiments could be used if either of fiber 102 or 132 were a multimode fiber and if either of fiber 102 or 132 were a double clad fiber. The GRIN or equivalent lenses 108 and 110 used in the design of the multi-functional optical isolator 130 have a numerical aperture large enough to accommodate a multimode pump beam for a double clad fiber.

A bulk-optic coupling of pump radiation into a single-mode or multi-mode core of the doped fiber is also possible. Increasing the tilt angle of the dichroic reflector 125 will result in a beam path where the reflected beam does not pass through the GRIN lens 108. In this embodiment, the dichroic reflector 125 is used to couple an off-axis, collimated beam to the input fibers 102, 132. This can be used to couple beams with a numerical aperture too large to be coupled through the GRIN lenses 108 and 110. Note that this off-axis beam could be coming from any external beam source and is not limited to the output of an optical fiber after collimation in a GRIN lens. It could be, for example, a light emitting semi-conductor, such as a diode-laser or diode laser array. A highly suitable source of optical pumping radiation consists of a Indium gallium aluminum arsenide laser diode array, emitting light having a wavelength of approximately 980 nm, which is attached to a heat sink. Such laser diodes are well known to those skilled in the art and may be obtained from a variety of suppliers (e.g., Spectra-Diode Laboratories, SONY, Laser Diode Inc., Siemens, etc.). It will also be appreciated, of course, that during operation the optical pumping source 138 will be attached to a suitable power supply. Electrical leads from the laser diode array which are directed to a power supply are not illustrated in the drawings for clarity.

The disadvantage of this approach is the astigmatism, depolarization and loss introduced to the main beam by the tilted coated plate. If these prove to be unacceptable, then a reflective beamsplitter may be used to overcome these limitations. Preferably the dichroic reflector is used to reflect the isolated beams, so that the beam path is vee shaped. Alternatively the dichroic reflector is used to reflect the isolated beams so that the beam path is vee shaped and an optical beam at another wavelength is transmitted through the reflector.

In yet another embodiment, a single channel isolator system may be used to couple a multimode pump source to a double-clad fiber.

The multi-functional optical isolator that is optimized for use with fiber amplifier has several advantages. Preferably, it consists of a polarization insensitive optical isolator operated with two or more noncoplanar beam paths. The isolator provides for each beam path having a separate isolated channel with minimal cross talk and back reflection. An isolator can be transformed into a multi-functional device that can both reduce costs for conventional devices and make possible the construction of more advanced devices in relatively conventional packages. System costs may also be reduced by eliminating the fused wavelength division multiplexing coupler in a single mode pumped system. Another advantage is that systems based on free-space coupling to unconventional fibers can be effectively integrated without the development of exotic fiber splicing techniques. Fibers of this type would include both double-clad or cladding-pumped fibers where there are unusual geometric constraints, or fibers based on phosphate, chalcogenide, telluride or fluorozirconate glasses where fusion splicing is not applicable.

Although illustrative embodiments of the present invention have been described in detail with reference to the accompanying drawings, it is to be understood that the invention is not limited to those precise embodiments and that changes and those skilled in the art may effect modifications therein without departing from the scope and spirit of the invention.

What is claimed is:

1. A multi-functional optical isolator for coupling optical radiation from a plurality of input fibers to a plurality of output fibers, said optical radiation being emitted within a specified wavelength range from each of said plurality of input fibers, with optical radiation emitted from each input fiber being transmitted only to a corresponding output fiber, while optical radiation emitted in a reverse direction within a specified wavelength range from any said output fiber is not transmitted to any of said input and output fibers, said isolator comprising:

means for focusing and collimating said optical radiation emitted from said plurality of input fibers;

isolation means for isolating said optical radiation;

optic means, said optic means not interfering with an isolator beam path, said optic means comprising a dichroic reflector positioned within the multi-functional optical isolator to reflect an off-axis, collimated beam at a wavelength outside an operating range of said optical isolator into at least one fiber of said input fibers and said output fibers, wherein the off-axis, collimated beam is received from a source different from the input fibers and the output fibers; and focus means for focusing said optical radiation onto said output fibers whereby said optical radiation from each said input fiber is coupled to its corresponding output fiber.

2. The multi-functional optical isolator of claim 1 wherein said isolation means includes polarizing elements and a magneto-optic polarization rotator.

3. The multi-functional optical isolator of claim 1 wherein said isolation means is a polarization insensitive type isolator.

4. The multi-functional optical isolator of claim 1, wherein said dichroic reflector reflects the off-axis, collimated beam into one input fiber.

5. The multi-functional optical isolator of claim 1, wherein said dichroic reflector reflects the off-axis, collimated beam into one output fiber.

6. The multi-functional optical isolator of claim 1, wherein said dichroic reflector reflects the off-axis, collimated beam into all of said input fibers.

7. The multi-functional optical isolator of claim 1, wherein said dichroic reflector reflects the off-axis, collimated beam into all of said output fibers.

8. The multi-functional optical isolator of claim 1, wherein the off-axis, collimated beam is generated by an external beam source.

9. The multi-functional optical isolator of claim 8, wherein said dichroic reflector reflects the off-axis, collimated beam into a single input fiber, where an additional fiber is parallel to said input fiber and passes through the same said first and second focusing lens.

10. The multi-functional optical isolator of claim 9, wherein said dichroic reflector is used to reflect isolated beams, thereby generating a vee-shaped beam path.

11. The multi-functional optical isolator of claim 10, wherein said dichroic reflector transmits an optical beam at a wavelength other than that of the isolated beams reflected by the dichroic filter.

12. An optical isolator for coupling optical radiation from an input fiber to an output fiber and for blocking optical radiation from the output fiber to the input fiber, the optical isolator comprising:

a first focusing lens for focusing and collimating the optical radiation emitted by the input fiber to generate collimated optical radiation;

an optical isolator comprising polarizing elements and a magneto-optic polarization rotator for transmitting the collimated optical radiation and for preventing any optical radiation from being transmitted to the input fiber from the output fiber;

a second focusing lens for focusing the collimated optical radiation into the output fiber; and dichroic reflectors positioned between the first focusing lens and the optical isolator and between the optical isolator and the second focusing lens to reflect a multimode pump beam, different from the optical radiation generated by the input fiber, into one of the input fiber and the output fiber, and wherein the one of the input fiber and the output fiber comprises a double clad optical fiber.

* * * * *